March 26, 1929.   D. J. YOUNG   1,706,686
PROCESS FOR THE MANUFACTURE OF MOTOR FUELS AND SIMILAR PRODUCTS
Filed April 13, 1927   3 Sheets-Sheet 1
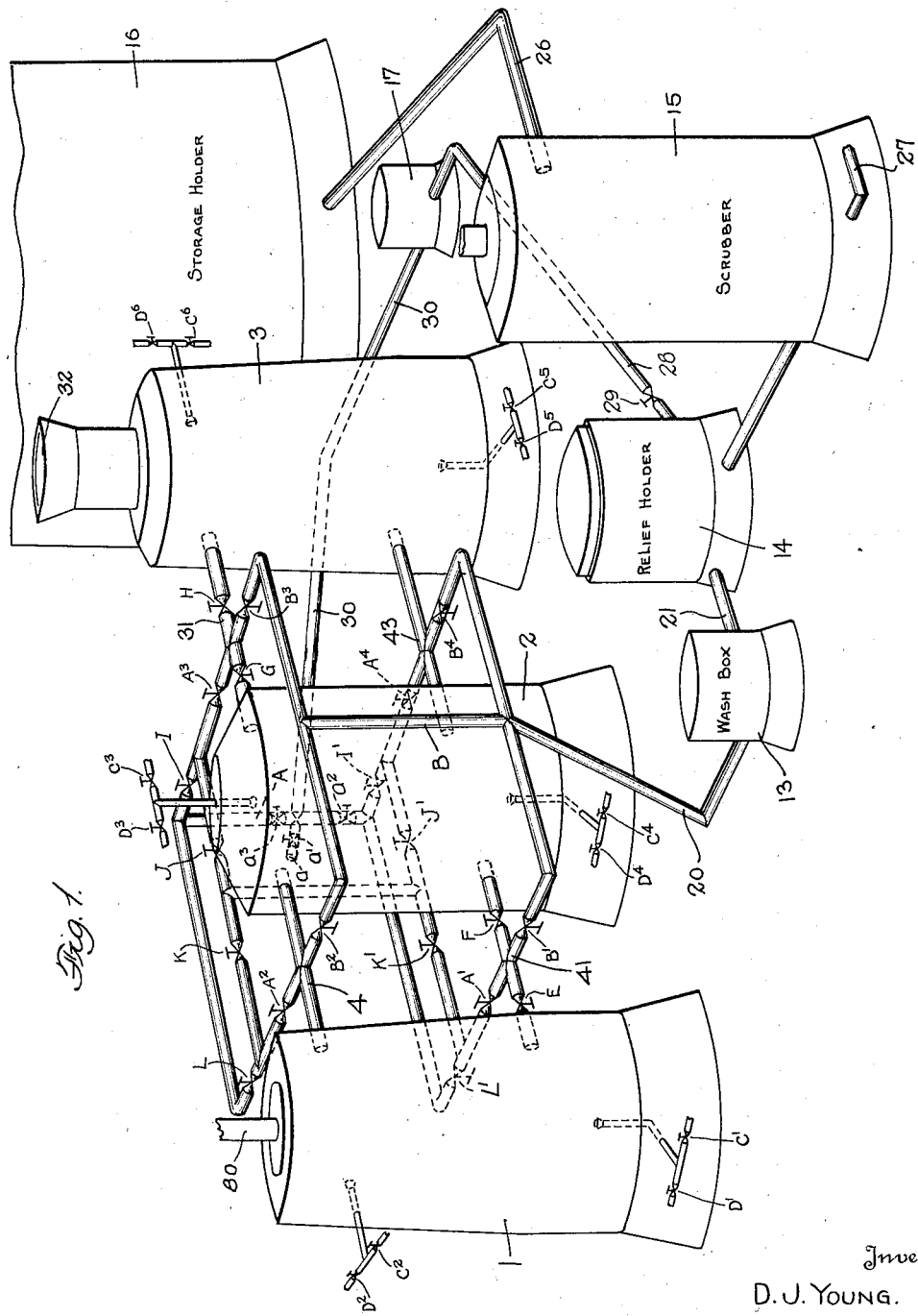
Inventor
D. J. Young.
By Munson H. Lane
Attorney

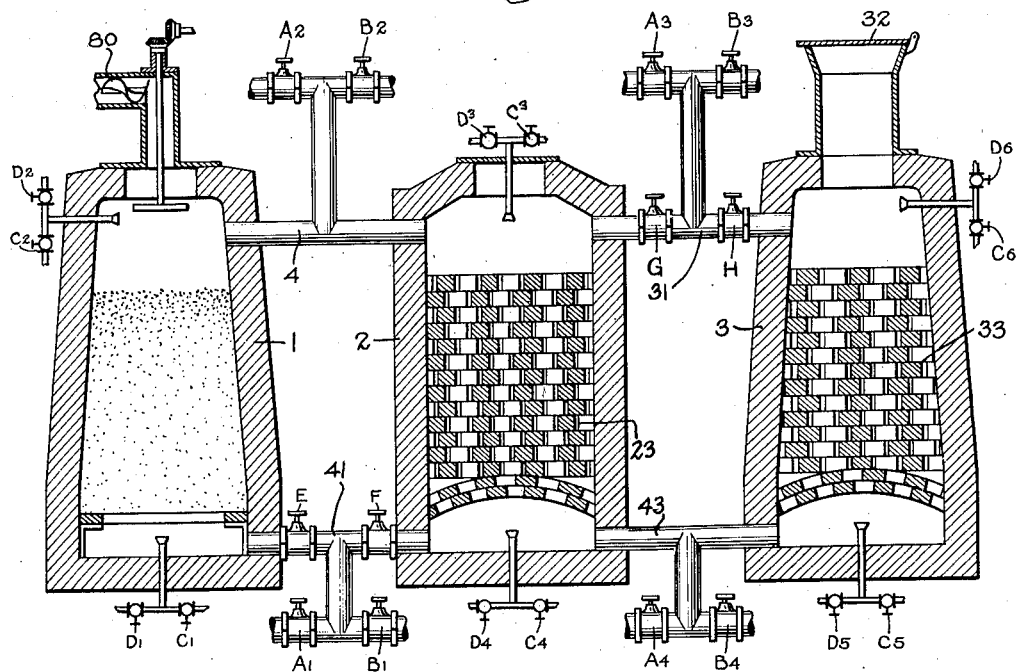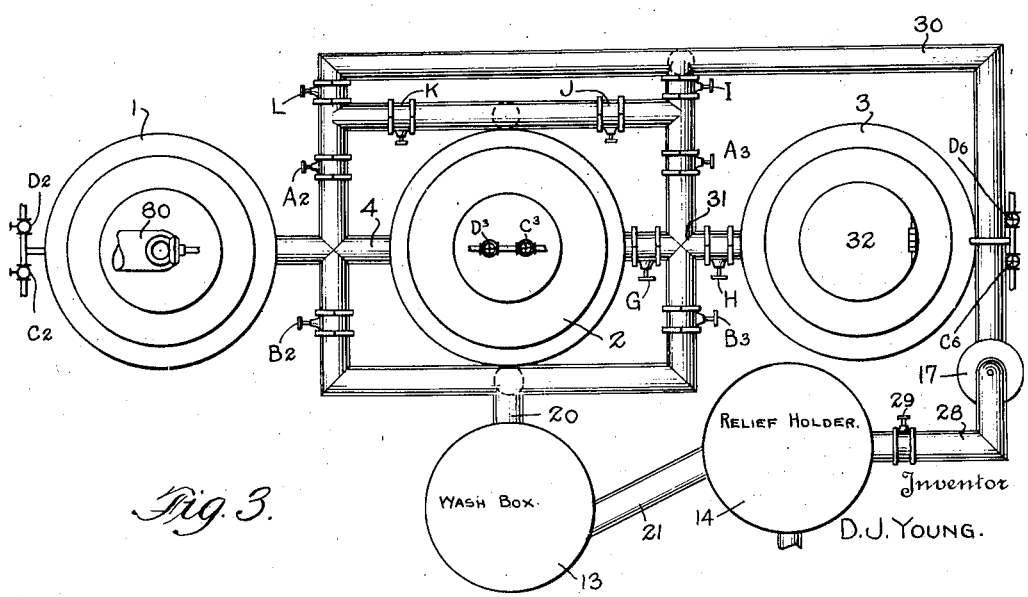

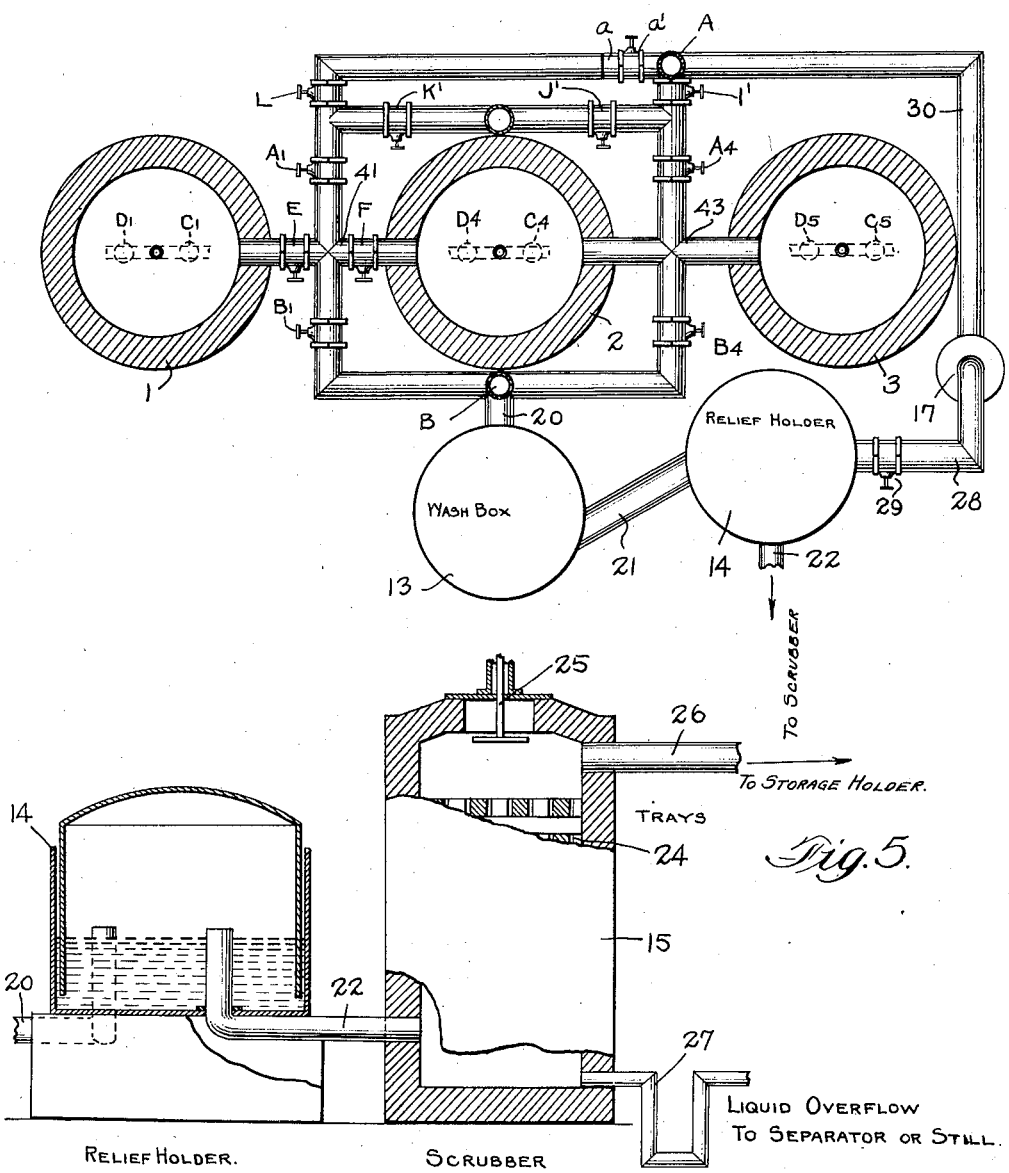

Patented Mar. 26, 1929.

1,706,686

UNITED STATES PATENT OFFICE.

DANIEL J. YOUNG, OF TACOMA, WASHINGTON.

PROCESS FOR THE MANUFACTURE OF MOTOR FUELS AND SIMILAR PRODUCTS.

Application filed April 13, 1927. Serial No. 183,625.

The invention relates to a new and useful process and apparatus for the manufacture of motor fuel and similar products.

This process and equipment is related to the back run process of manufacturing water gas covered by patents issued to me and other applications now pending.

This application is a continuation in part of my copending applications as follows:— S. N. 570,207, filed June 22, 1922; S. N. 658,393, filed Aug. 20, 1923; S. N. 752,104, filed Nov. 25, 1924; S. N. 37,931, filed June 18, 1925; S. N. 41,733, filed July 6, 1925; S. N. 56,301, filed Sept. 14, 1925; S. N. 97,603, filed March 26, 1926; S. N. 97,604, filed March 26, 1926.

Acknowledgment is made also of the applications of George E. Whitwell, S. N. 634,811, filed April 26, 1923, and F. W. Steere, S. N. 637,159, filed May 7, 1923.

In the manufacture of carbureted water gas it is well-known that there has always been produced a certain amount of by-product commonly called water gas tar. There are also contained in water gas certain unsaturated hydrocarbons which may be condensed or otherwise extracted from the gas in a known manner. I have discovered that the quality and amount of these tars and unsaturated hydrocarbons can be to a large extent controlled if means are provided for a control of temperature and other conditions in the various parts of an oil treating apparatus similar to a water gas set. I have also discovered that the addition of various gases and liquids into such an apparatus under controlled conditions of temperature will materially affect the production of the tars and hydrocarbons, this principle having been recognized in my applications above referred to, especially applications, Serial Nos. 570,-207, 97,603 and 97,604.

The object of my invention is to provide an apparatus similar to a water gas set, so designed that the temperature and other conditions in the various parts of the apparatus may be easily and readily controlled. It is well known that in the heating of a water gas set, when air is blown through the fuel bed, a producer gas is formed, and that the location of the secondary air to burn this producer gas governs the point of maximum temperatures in the checker brick.

A water gas set consists essentially of a generator or fuel chamber and heat interchanger or interchangers commonly known as the carburetor and superheater. The accepted form of water gas set commonly known as a three shell set, was adopted for structural and operating advantages. Similar results may be obtained in a two or four shell set, but the economic reasons of ease of operation, cost of original construction, ease of repair and maintenance, cost of necessary superstructures such as buildings and fuel handling equipment, inconvenience of auxiliary apparatus and many factors have proven the three shell set to be, ordinarily, the most economical and efficient. I will describe an apparatus similar to the three shell set, as a preferred design.

The present invention confines itself to the process and apparatus to produce proper temperature and other conditions for the various reactions to best take place and is not concerned specifically with methods of handling the products, either gaseous or liquid, after having been discharged from the set.

The invention may be more readily understood by reference to the accompanying drawings which are intended for the purpose of illustration only, and are largely diagrammatic in character.

In the drawings:—

Fig. 1 is a diagrammatic view showing an arrangement of the gas making and oil treating portion of the apparatus, including the scrubber or condenser, in which liquid and gaseous products are separated, no portion of the cracking or purifying apparatus for treating the liquids after separation, being shown, as any well-known or standard apparatus may be employed for this purpose.

Fig. 2 is a vertical section showing a gas generator and two heat interchangers, and the connections for supplying steam, air, gas and fuel, and for withdrawing gas from the set, this construction being slightly different from the arrangement shown in Fig. 1, in that Fig. 1 all the connections for supplying air, gas or the like are interconnected, and all the gas outlets are interconnected, whereas in Fig. 2 the air and gas inlets are separate and distinct and the various gas offtakes are also separate from each other.

Fig. 3 is a more detailed top view of the arrangement shown diagrammatically in Fig. 1.

Fig. 4 is a bottom sectional view similar to Fig. 3 but showing the lower connections.

Fig. 5 is a view showing the relief holder and scrubber, including the outlets from the scrubber by which gas may be conveyed to a storage holder and liquids conveyed to suitable separators or stills.

The apparatus employed may be similar to that set forth in my copending application, S. N. 97,604, filed March 26, 1926, with modifications which will be apparent from the present description and consists of a standard three shell water gas set as the basis of its design. There is, however, added to it where necessary, means for introducing air or other gases, steam, powdered fuel, oil or other liquids or fuels, and means for withdrawing gas or other products at the following points:

1st. Bottom of generator.
2nd. Top of generator.
3rd. Top of carburetor.
4th. Bottom of carburetor.
5th. Bottom of superheater.
6th. Top of superheater.

These specific locations are selected largely for structural and operating reasons. The object of these many connections is to provide both an inlet for the various necessary elements in the process, and the outlet for the resultant products at every point where material differences in temperature and other conditions may be expected and the points selected practically cover all such points. Valves or other means of controlling such inlets and outlets are provided so that the direction of flow through the set may be controlled as desired. For instance the flow may be from bottom of generator through the carburetor and superheater leaving the set at the top of the superheater, or it may be just the reverse of this. The flow may be from the bottom of the generator and from the top of the superheater, leaving the set at the bottom of the carburetor.

It may also be desirable to have connections similar to the old up and down run water gas set so as to make the flow even more flexible although it is believed that such connections necessitating expensive and inefficient valves for handling hot gases will not be necessary.

In other words my invention consists in providing a method of producing the widest possible variety of conditions of temperature and raw product control in a simplified standard apparatus.

The apparatus includes as a basis of its design the usual water gas set, with certain modifications to be described hereinafter, and comprises the generator or fuel chamber 1, and the heat interchangers 2 and 3, commonly known as the carburetor and superheater, respectively.

These shells are of substantially standard design and as they are well known in the art they need not be described in detail, except with reference to the various connections by means of which the control of temperature and other conditions is obtained. The generator may be supplied with the charging means 80, Fig. 2, described in my Patent, No. 1,468,190, and in my pending applications, and the superheater 3 may be provided with a blast cap 32 as shown. The carburetor and superheater may be provided respectively with checkerbrick 23 and 33 of any desired description. A wash box 13, relief holder 14, scrubber 15, storage holder 16, and recirculation pump 17 may be provided, these being of any desired or standard construction.

From the bottom of the scrubber a liquid overflow pipe 27 leads to the various devices for purifying, separating, cracking and otherwise treating the liquid constituents derived from the process, such products including tar, ammonia, and many other important constituents. From these constituents I am enabled to separate out a product which may be used successfully as a motor fuel. The specific apparatus for cracking, purifying and otherwise treating the said liquid constituents is not shown in detail, as well known apparatus may be employed for this purpose, in connection with the other apparatus herein described.

The connections for supplying air, steam, gas, fuel, oil and the like to the generator, carburetor and superheater, and for withdrawing gas oil vapors from the top and bottom of the generator, carburetor and superheater will now be described.

For simplicity, all gas or air inlets and their respective valves are referred to by the letter A with suitable differentiating exponents; all gas outlets and their valves are designated by the letter B with suitable exponents, all steam and water inlets and their control valves by the letter C with suitable exponents, and all oil or atomized fuel pipes, inlets or control valves are designated by the letter D with suitable exponents. Valves which control the flow through the set as a whole, rather than in particular inlets or outlets are designated by the letters E, F, G, and H in Fig. 2. In Figs. 1, 3 and 4, which show the various air supply pipes interconnected, and the various gas offtakes interconnected, additional control valves as I, J, K, and L are required.

The connections to and from the three main shells of the set, namely the generator, carburetor, and superheater, will be most readily understood by reference to Fig. 2, for the reason that in this figure no attempt is made to show interconnections between the various air inlets, and between the various gas offtakes. In practice it is frequently desirable to have the various gas offtakes entirely separate, for the reason that constituents of widely varying qualities can be taken off from the individual offtakes and used for various purposes. Where, however, all the gaseous constituents are to be mixed in a single holder the arrangement shown in Figs. 1, 3 and 4 may be employed.

Referring particularly to Fig. 2, the air or gas inlet control valves are designated as $A'$, $A^2$, $A^3$ and $A^4$. The gas offtake control valves are shown at $B'$, $B^2$, $B^3$ and $B^4$. The steam or water inlet control valves are designated as $C'$, at the bottom of the generator, $C^2$ at the top of the generator, $C^3$ at the top of the curburetor, $C^4$ at the bottom of the carburetor, $C^5$ at the bottom of the superheater and $C^6$ at the top of the superheater. The oil or atomized fuel, which may be either liquid or finely divided solid fuel, may be supplied through control valve $D'$ at the bottom of the generator, $D^2$ at the top of the generator, $D^3$ at the bottom of the carburetor, $D^4$ at the top of the carburetor, $D^5$ at the bottom of the superheater and $D^6$ at the top of the superheater.

It will be noted that a permanently free and unobstructed passageway may be had for the passage of gas through the system as a whole through pipe connection 4 connecting the top of the generator with the top of the carburetor, and through pipe 43 connecting the bottom of the carburetor with the bottom of the superheater.

Control valves E and F are located in the passage 41 connecting the bottom of the generator with the bottom of the carburetor, and control valves G and H are located in the passage 31 intermediate the tops of the carburetor and superheater.

The air supplied through the various inlets may come from separate and independent sources, if desired, and likewise the products taken off from the various gas offtakes may go to separate wash boxes, purifiers, separators, and other known apparatus for treating combustible gas, and its by-products, both liquid and gaseous.

If desired, however, the air inlets may be interconnected, and likewise the gas offtakes may be interconnected, as shown in Figs. 1, 3 and 4; all the gases passing from a single common offtake pipe to wash box 13, through pipe 21 to relief holder 14, thence through pipe 22 to the scrubber 15, containing trays 24 in which the liquid and gaseous constituents are roughly separated, as by means of the spray 25 at the top of the scrubber, the gases passing through pipe 26 to the relief holder 16 and the liquid constituents passing through pipe 27 to the separators, stills and other apparatus for further treatment, in a well-known manner.

Where it is desired to recirculate a portion of the combustible gases taken off from the set, in the manner set forth in Whitwell application, Serial No. 634,811, filed April 26, 1923, pipe 28 connects with pump or fan 17, the said pipe being supplied with a control valve 29. Thus when the valve 29 is open and the pump 17 in operation, a portion of the gases is by-passed through pipe 30 to the air main A which supplies all the air inlets.

If desired, a steam or other jet device placed in the by-pass connection may be employed for effecting the recirculation of gas, in place of the pump or fan 17.

Air may be supplied to the upright main A through pipe $a$ controlled by a valve $a_1$. Likewise valves $a_2$ and $a_3$ are provided in the main A above and below the pipes $a$ and 30. The air main A connects two sets of pipe connections, one at the top and one at the bottom of the set, through which the air or gas, or a mixture of both may be supplied to the shells 1, 2 and 3, through the inlets previously described. The upper pipes are controlled by valves I, J, K and L, while the lower pipes are controlled by similar valves $I^1$, $J^1$, $K^1$ and $L^1$.

Similar sets of pipes connect the gas offtakes at the top and bottom of the system, the upper set being controlled by valves $B^2$ and $B^3$ while the lower set is controlled by valves $B^1$ and $B^4$. An upright gas main B connects the upper and lower sets of pipes, and from the bottom of this main the gas offtake 20 leads to the wash box 13, as previously described.

The parts and connections described above in detail are to be understood as illustrative only, as showing one means for carrying out the processes described herein, but it will be understood that other means may be employed for carrying out the same, or equivalent processes.

I will describe several cycles of operation, all of which will produce a considerable amount of motor fuels and other liquid products, and at the same time as a by-product produce gas which may be used in an industrial or commercial gas plant.

1. (*a*) Blast as in the standard water gas operation, but add the secondary air at the bottom of the superheater. This will heat the superheater somewhat higher than in the standard water gas operation, and the carburetor somewhat lower. Referring to Fig. 2, this operation may be accomplished by opening valves $A^1$ and $A^2$, E and the stack valve, all the other valves shown in this figure being closed.

(*b*) *Run.*—During the run I introduce steam at the bottom of the generator, oil at the top of the carburetor, and if desired, at the top of the superheater taking off gas at the bottom of the superheater. After such a cycle, I introduce steam at the top of the superheater and take off gas at the bottom of the generator, to make water gas, and to remove the carbon which has accumulated on the checkerbrick. It is obvious that the resultant gas will contain a much larger amount of liquids than standard water gas, which liquids may be recovered by any of the well known methods.

It is not necessary to introduce oil at both the carburetor and superheater, as it may be introduced at either point, or at the top of the generator, or at all three locations at once. Pulverized solid fuel containing volatiles may be substituted for the oil, if desired.

The first part of cycle 1 (b) may be accomplished by leaving valves $C^1$, $D^3$, $D^6$ and $B^4$ open, all the other valves shown in Fig. 2 being closed.

The second part of cycle 1 (b) may be performed by leaving the valves $C^6$, E and $B^1$ open, all the others shown in Fig. 2 being closed.

2. (a) Blast according to the standard water gas method. (b) Then introduce oil at the top of the superheater and take out the gas at the bottom of the generator. (c) Follow this with a back steam run to remove the carbon. Such operation will deposit on the fuel bed acting as a filter, most of the heavier tars thus tending to build up the fuel bed, and the resultant gas will contain only the lighter condensible hydrocarbons, which may be recovered. This method of operation will be desirable when oils of high free carbon content are used.

During cycle 2 (a), the valves $A^1$, E, $A^2$ and the stack valve are open, and all the others closed. During 2 (b) the valves $D^6$, E and $B^1$ are open and the others closed. During 2 (c) the valves $C^6$, E and $B^1$ are open, and the others closed.

The gas and volatiles are withdrawn from the bottom of the generator.

In this cycle also, the oil may be admitted at the carburetor, or at the top of the generator, or at two or more locations at once, if desired, and, as heretofore stated, pulverized solid fuel containing volatiles may be substituted for the oil.

3. (a) Air blast in the standard manner and then (b) introduce oil at the top of the carburetor, if desired, and at the top of the superheater, taking off the gas at the bottom of the superheater, using no steam during this part of the run. At the end of the oil run steam may be used, employing either an up run or a back run to free the superheater of carbon. In 3 (a) the valves $A^1$, E, $A^2$, and the stack valve of Fig. 2 are open, and the others closed. During the first part of 3 (b) in making an uprun, the valves $C^1$, H and $B^3$ are open and the others closed. In making a back run, the valves $C^6$, E and $B^1$ of Fig. 2 are open and the others closed. In order to separate the gases taken off from various outlets, it may be desirable to provide separate means for withdrawing and storing gas from each outlet, and I therefore prefer to provide means for the separation of the gas from each outlet from the other gases. For instance the gases made when no oil is being introduced will be comparatively low in heating value, and may be used for heating stills, boilers, or other accessories. The rich gas taken off during the oil run may be first stripped of its liquid contents and used for commercial purposes. Any ammonia present may also be separated in a well known manner.

The gases produced under different cycles will vary materially in specific gravity, and this fact may make it desirable to keep them separate.

The gas after having the valuable oils removed may be of such quality that it is not desirable to use it as such. With the apparatus described, this gas may be passed through the set again by any suitable means as pump 17, and again subjected to heat, which will change it into the desired quality, such re-circulation being described in the copending application of George E. Whitwell, Serial No. 634,811, filed April 26, 1923.

It will be obvious that the present applications embodies the backrun principle specifically claimed in its relation to a gas making process in other of my applications, the present application dealing more particularly with the application of the backrun to the manufacture of motor fuels and other liquid products. The apparatus employed is substantially the standard water gas apparatus, with modifications, which may be readily applied, and is simple in construction and easy to operate, in such a manner that an infinite variety of temperature conditions may be obtained, whereby the quality and composition of the resulting product may be regulated as desired. In addition, there is described an easy and efficient means for producing the heat employed in the gas making and oil cracking operations, making use of the ordinary standard water gas generator, this generator being utilized for the water gas reactions when desirable. Also, a simple means is provided for passing steam over the checker-brick of the carburetor and superheater, thus freeing them from an accumulation of carbon.

The raw products used are cheap and easily obtainable. For example, crude oil may be used in the carburetor and superheater in place of the expensive gas oils at present employed, or finely divided powdered fuel containing volatiles, may be employed in place of the oil. The gases employed are generally air and steam, though for the distilling operation hydrogen, or even an inert gas, such as nitrogen, may be used in place of or together with steam during the back run, to serve as a carrier of heat, or as a source of nitrogen, where ammonia is to be recovered from the product. Also, where oxygen is available, this may be substituted for the air used in blasting, under certain circumstances. Instead of steam, water may be employed, as set forth in some of my copending applications. Other modifications and variations may be resorted to within the scope of the appended claims.

I claim as my invention:—

1. A process for producing liquid hydrocarbons, combustible gas and similar products, in an apparatus comprising a fuel chamber containing solid carbonaceous fuel, and a heat interchanger chamber in communication therewith, which process comprises producing material differences of temperature between different zones in the apparatus by blasting the fuel in the fuel chamber and passing the resulting hot gases through the heat interchange chamber, and after the temperature differences have been established, selectively admitting fluids, including air, steam, combustible gas and finely divided hydrocarbons to the apparatus at zones between which material temperature differences exist, subjecting such fluids to heat treatment and chemical reaction in the apparatus, and selectively withdrawing the resulting gaseous products from zones between which material temperature differences exist, after having passed through the fuel bed, and separating liquid hydrocarbons from said gaseous product.

2. A process for producing liquid hydrocarbons, combustible gas and similar products in an apparatus comprising a fuel chamber containing solid carbonaceous fuel, a primary heat interchange chamber and a secondary heat interchange chamber, which process comprises producing material differences of temperature between different zones of the apparatus by blasting the fuel in the fuel chamber and passing the resulting hot gases through the heat interchangers, the zones between which material temperature differences exist including the tops and bottoms of each of said chambers, and after the temperature differences have been established, selectively admitting fluids, including air, steam, combustible gas and finely divided hydrocarbons to the apparatus at the top of the fuel chamber, the bottom of the fuel chamber, the top of the primary heat interchange chamber, the bottom of the primary heat interchange chamber, the top of the secondary heat interchange chamber and the bottom of the secondary heat interchange chamber, subjecting such fluids to heat treatment and chemical reaction in the apparatus and selectively withdrawing the resulting gaseous products from the various zones between which material temperature differences exist, after having passed through the fuel bed, and separating liquid hydrocarbons from the gaseous product.

3. A method of making combustible gas and liquid hydrocarbon fuel in an apparatus comprising a fuel heating chamber containing a bed of solid fuel, and a heat interchanger consisting of at least one shell containing checkerbrick, which method consists in first air blasting the fuel bed of the fuel heating chamber and storing the resulting heat in the heat interchanger, then introducing carbonaceous material containing volatiles into the heat interchanger, whereby a gas is produced, passing said gas in a direction reverse to the blast through the heat interchanger and through the fuel bed of the fuel heating chamber, withdrawing the gaseous product directly from the fuel heating chamber, and cooling said product to separate the condensible portions from the fixed gas.

4. A method of making combustible gas and liquid hydrocarbon fuel in an apparatus comprising a fuel heating chamber containing a bed of solid fuel, a primary heat exchanger and a secondary heat exchanger, which consists in air blasting the fuel heating chamber and storing the resulting heat in the primary heat exchanger and superheater, then introducing carbonaceous material containing volatiles at the top of the secondary heat exchanger, passing it in a direction reverse to the blast, through the set as a whole, withdrawing the resulting gaseous product from the bottom of the fuel heating chamber after passing through the fuel bed, and cooling said product to separate the condensible portions from the permanent gas.

5. A process of simultaneously making motor fuel and combustible gas by air blasting and thereby heating a solid fuel bed in a fuel chamber, burning the blast gases to heat oil treating and heat exchanging chambers, generating combustible gas by steam blasting the heated fuel bed, passing the heated combustible gas into the oil treating chamber in contact with liquid hydrocarbon and thereby vaporizing the hydrocarbon, passing the mixed hydrocarbon vapors and combustible gas into a heat exchanging chamber and a scrubber and thereby separating and recovering hydrocarbon motor fuel from the combustible gas, then intermittently passing steam reversely through the heat exchanging, oil treating and fuel chambers to remove deposited carbon and to generate combustible gas, and periodically repeating the aforesaid cycles.

6. A process for simultaneously making liquid hydrocarbons and combustible gas, by air blasting a bed of solid fuel in a fuel chamber, burning the blast gases to heat oil treating and heat exchanging chambers, generating combustible gas by steam blasting the heated fuel bed, passing the heated combustible gas into the oil treating chamber in contact with liquid hydrocarbon and thereby vaporizing the hydrocarbons, passing the mixed hydrocarbon vapor and combustible gas into a heat exchange chamber and withdrawing the gaseous product from the heat exchange chamber, intermittently passing steam reversely through the heat exchanging, oil treating and fuel chambers to remove deposited carbon and produce gaseous products, withdrawing said gaseous products from the fuel chamber, periodically repeating the aforesaid cycles, and separating and recovering liquid hydrocarbons suitable for use as a motor fuel from the combustible gas in the withdrawn gaseous products.

7. A process for simultaneously making liquid hydrocarbons suitable for use as a motor fuel, and combustible gas, by air blasting a bed of solid fuel in a fuel chamber, burning the blast gases to heat oil treating and heat exchanging chambers, generating combustible gas by steam blasting the heated fuel bed, passing the heated combustible gas through the oil treating chamber in contact with liquid hydrocarbons and thereby vaporizing the hydrocarbons, passing the mixed hydrocarbons for vapors and combustible gas through the heat exchange chamber, withdrawing the gaseous product from the heat exchange chamber, and intermittently extracting the volatile hydrocarbon constituents of finely divided raw fuel by mingling with said fuel a highly heated gas, then sweeping said volatile constituents and gas through the fuel chamber in a direction reverse to the aforesaid steam run, withdrawing the resulting gaseous products from the fuel chamber, and separating and recovering liquid hydrocarbons from the withdrawn gaseous product.

8. A process for making liquid hydrocarbons suitable for use as motor fuel, and combustible gas, by air blasting a bed of solid fuel in a fuel chamber, burning the blast gases to heat oil treating and heat exchanger chambers, generating combustible gas by steam blasting the heated fuel bed, passing the heated combustible gas into the oil treating chamber in contact with liquid hydrocarbons, and thereby vaporizing the hydrocarbons, passing the mixed hydrocarbon vapor and combustible gas into a heat exchange chamber and a scrubber and thereby separating and recovering liquid hydrocarbons from the combustible gas, then intermittently passing a gas making fluid reversely through the heat exchanging and oil treating chambers, whereby it is highly heated, mingling finely divided raw fuel containing volatile hydrocarbons with said highly heated gas and thereby extracting said volatile hydrocarbons, then sweeping said volatile constituents and heated gases through the fuel chamber, withdrawing the gaseous product from the fuel chamber after passing through the fuel bed, and separating and withdrawing the liquid hydrocarbons from the combustible gas.

9. A process for simultaneously making liquid hydrocarbons suitable for use as a motor fuel and combustible gas, by air blasting a bed of solid fuel in a fuel chamber, burning the blast gases to heat a heat interchanger, generating combustible gas by steam blasting the heated fuel bed, passing the combustible gas through the heat interchanger and mingling with said gas finely divided raw fuel containing volatile hydrocarbons, employing the heat of said combustible gas and the heat stored in said heat interchanger for extracting and vaporizing the hydrocarbons, separating and recovering liquid hydrocarbons from the combustible gas, and intermittently passing a gas making fluid reversely through the heat exchanger, and fuel chamber, employing said reverse gas stream for extracting volatiles from finely divided raw fuel, withdrawing the gaseous product from the fuel chamber after passing through the fuel bed, and separating and recovering the liquid hydrocarbons from the combustible gas.

In testimony whereof I affix my signature.

DANIEL J. YOUNG.